L. J. ANDREWS.
TRAP.
APPLICATION FILED DEC. 27, 1920.
1,376,308.
Patented Apr. 26, 1921.
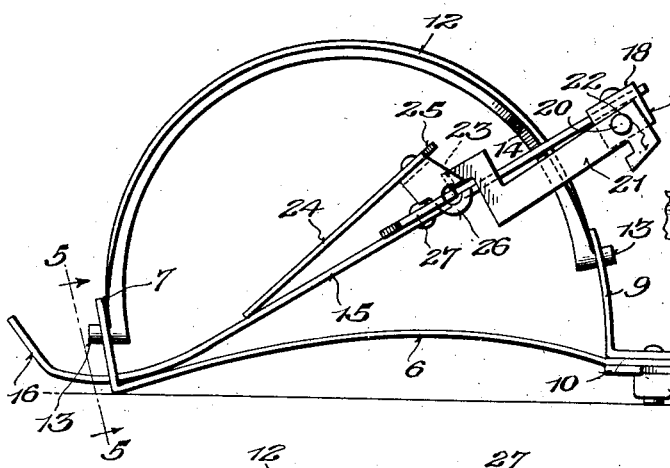
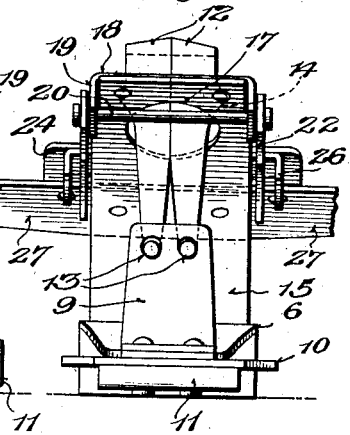
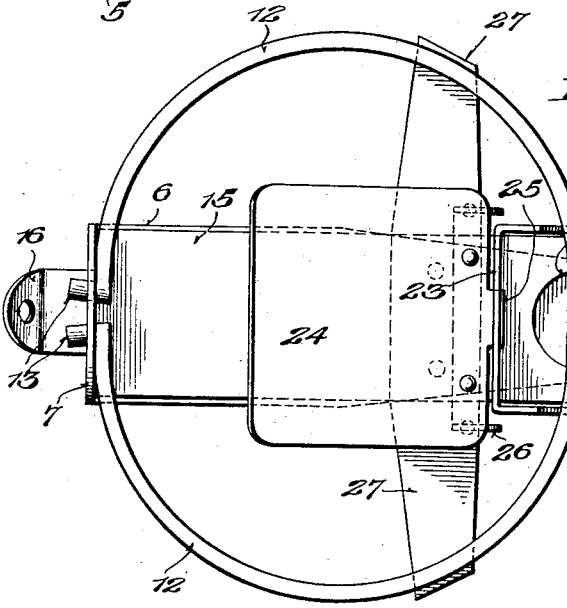
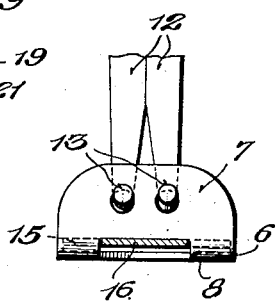
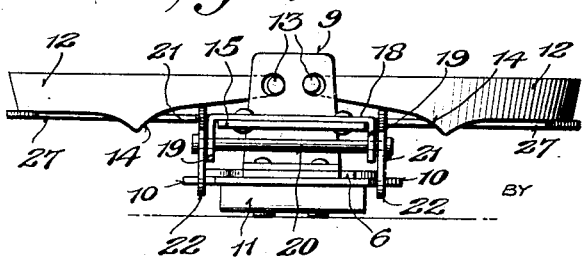
Inventor
Lawrence J. Andrews,
BY Royal E. Burnham,
Attorney

UNITED STATES PATENT OFFICE.

LAWRENCE J. ANDREWS, OF FALK, IDAHO.

TRAP.

1,376,308.

Specification of Letters Patent.   Patented Apr. 26, 1921.

Application filed December 27, 1920.   Serial No. 433,276.

*To all whom it may concern:*

Be it known that I, LAWRENCE J. ANDREWS, a citizen of the United States, residing at Falk, in the county of Payette and State of Idaho, have invented certain new and useful Improvements in Traps, of which the following is a specification, reference being had therein to the accompanying drawing.

It is an object of this invention so to form and arrange the parts of a coacting-jaw spring-trap that its jaws will be brought forcibly to closing position even when earth or other surrounding or concealing material is frozen. This is of importance, because traps of the types commonly used by trappers often fail to spring because the parts thereof are frozen.

With this object, among others, in view, means are provided to apply force from the spring of the trap against the jaws at points distant from their axes, whereby direct action against the jaws to lift them from frozen earth or other materials having a tendency to keep them from closing is had; the parts are arranged in such manner that the spring does not have closing action on the jaws near their axes immediately upon being released, but only after initial movement is given the jaws by pressure at their outer spread, with the result that closing action is exerted on the jaws near their axes after the spring has gained momentum; and an improved form of trigger is provided.

The details of construction and arrangement of parts contemplated by the invention will be apparent from the accompanying drawings, forming part hereof, wherein an embodiment of the invention is disclosed, for purposes of illustration.

Although the disclosures herein exemplify what now is considered to be a preferable embodiment of the invention, it is to be understood that it is not the intention to be limited necessarily thereto in interpretation of the claims, as modifications and adaptations within the limits of the claims can be made without departing from the nature and spirit of the invention.

Like reference-characters refer to corresponding parts in the views of the drawing, of which—

Figure 1 is a side elevation of the trap in sprung condition;

Fig. 2 is an end view of the trap in that condition;

Fig. 3 is a plan view of the trap in set condition;

Fig. 4 is an end view of the jaws; and

Fig. 5 is a view of an end of the base member.

Having more particular reference to the drawing, 6 designates a base member of spring material, which is arched upwardly between its ends. One end portion of the member 6 extends upwardly as an upright or ear 7, which has a transverse slot 8 at its base. A somewhat longer upright or ear 9 extends upwardly from the other end portion of the member 6, a cross member 10 is secured to that member below the ear 9 and projects from each side thereof, and a foot 11 is provided to keep the cross member 10 slightly above the ground.

A pair of arcuate gripping-jaws 12 are mounted swingably by terminal pintles 13 thereof extending into apertures near the upper ends of the ears 7 and 9. Near the ends of the jaws mounted on ear 9 they have outwardly-flared cam-edges 14 against which wedging action may be had in closing them by a spring member 15.

The member 15 is a substantially flat spring, by which clamping or closing movement is imparted to the jaws. It is held fixedly at one end by a reduced terminal portion 16, which extends through the slot 8 at the base of the ear 7.

The members 6 and 15 are shaped and tensioned in such manner that the member 15 in the end portion opposite to the terminal 16 has a tendency to spring forcibly away from the member 6. In that portion it has an opening 17 of a size to permit it to pass over the ear 9 and to have its edges exert wedging action against the cam-edges 14 of the jaws.

A cross member 18, having depending end portions 19, is secured to the free end of the member 15 beyond the jaws, and swingably mounted on those end portions, as by a rod 20, is a trigger for holding the member 15 in set condition. The trigger includes side arms 21 through which the rod 20 extends, a detent 22 extending from each of the arms below the pivotal point arranged to engage cross member 10 of the member 6, and a cross piece 23 connecting the opposite ends of the arms and extending across and above the member 15.

A pan 24 has a lug 25 arranged to extend under the cross piece 23 and to hold the detents 22 in engagement with the member 10 and the spring member 15 over the ear 9 when the trap is set. The pan is mounted swingably in any suitable manner, as on ears 26 extending into openings in a closing member 27. The parts are so relatively formed and arranged that, when the pan is pressed downwardly, the lug 25 will be withdrawn from the cross piece 23 and the trigger released.

The closing member 27, which preferably is in the form of a plate or bar, is secured to the top of the spring member 15, and it is of such length that it may press against the jaws at their outer spread when open and impart initial closing movement thereto.

The ear 9 is of sufficient height to give a considerable clearance (about three-quarters of an inch in traps of the size most commonly used) between the ends of the jaws mounted in that ear and the top of the spring member 15 when that member is held down by the trigger. When the trap thus is set, the jaws may rest at their outer spread on the closing member 27, but preferably (and especially under conditions of temperature in which the jaws are liable to be frozen in earth or other concealing material) the jaws are held slightly above that member—say one-eighth of an inch—by a pebble, stick, or clod, in order that the member may gain momentum before striking the jaws.

When the trap is sprung by downward pressure on the pan, as by the foot of an animal, the lug 25 is released from the cross piece 23. Exertion of the spring member 15 thereupon causes release of the detents 22 from the member 10, the engaging edges of the detents being inclined slightly to permit such release, and the cross piece 23 falls toward the member 15.

Upon release of the spring member 15 from restraint of the trigger, the closing member 27 is moved upwardly and has forcible action or delivers a blow against the jaws at points of their outer spread and of greater leverage than nearer the axes. Such action is sufficient under conditions usually pertaining to release the jaws from frozen earth or other concealing or encumbering material, especially if the jaws have been held slightly above the member 27, as hereinbefore described.

Action of the member 27 against the jaws occurs before the edges of the opening 17 reach the sides of the jaws. By the time those edges come into contact with those sides, the member 15 has had greater momentum than it would have if it engaged the jaws immediately upon release. Thus the spring member has more powerful action against the cam edges of the jaws in moving them in closing direction against a foot or other part that has depressed the pan and tripped the trigger.

Having thus described my invention, what I claim as new, and desire to secure by Letters Patent, is—

1. A trap comprising a base having a short upright at one end and a longer upright at the other end, jaws swingably mounted on said uprights, a spring having an opening arranged to receive said longer upright and tensioned to move therefrom over adjacent end portions of the jaws to close them, and a trigger arranged to hold said spring over said upright in a position removed from the pivotal axes of said jaws.

2. A trap comprising a base, jaws swingably mounted thereon, a spring arranged to have closing action on said jaws at places near their axes, a cross member on said spring arranged to have closing action against the outer spread of said jaws on initial closing movement of the spring, and a trigger arranged to hold said spring in set condition.

3. A trap comprising a base, jaws swingably mounted thereon, a flat spring fixed at one end to said base and tensioned to have closing action at its other end portion against said jaws, a cross member on said base below the free end of said spring, a trigger including side arms swingably mounted on said spring above said cross member, a cross piece connecting said arms and extending across the upper side of said spring, and detents on said arms arranged to engage said cross member and to hold said spring in set condition when the cross piece of the trigger is in raised position, and a pan arranged to hold said cross piece in that position.

4. A trap comprising a base, jaws swingably mounted thereon, a flat spring fixed at one end to said base and tensioned to have closing action in its other end portion against said jaws at places near their axes, a cross member on said base below the free end of said spring, a member on said spring arranged to have closing action against the outer spread of said jaws on initial closing movement of said spring, a pan swingably mounted on said latter member, and a trigger comprising side arms swingably mounted on said spring, a cross piece connecting said arms arranged to be held in raised position by said pan, and detents on said arms arranged to engage the cross member on the base when the trigger cross piece is held in raised position by said pan and thereby maintain the spring in set condition.

In testimony whereof I affix my signature.

LAWRENCE J. ANDREWS.